J. J. CONNOR.
CALK OR CREEPER ATTACHMENT FOR HORSESHOES.
APPLICATION FILED MAR. 24, 1911.
1,001,252. Patented Aug. 22, 1911.
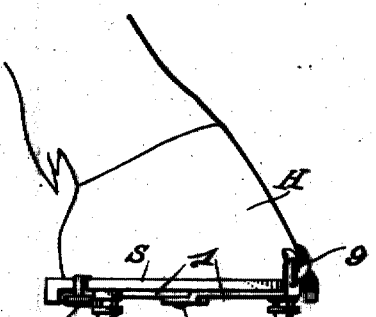
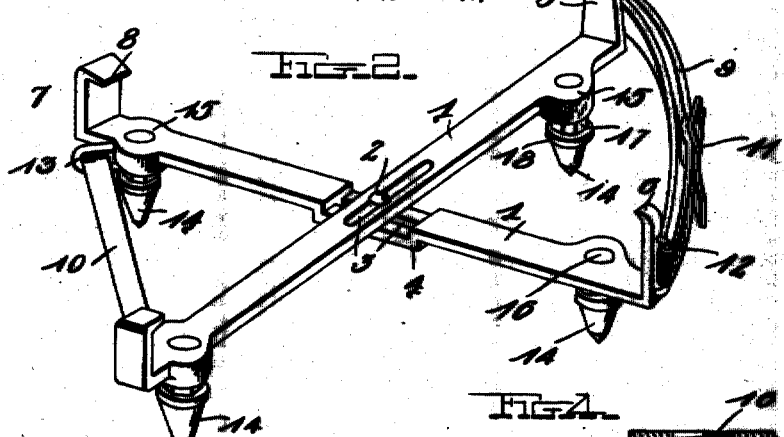
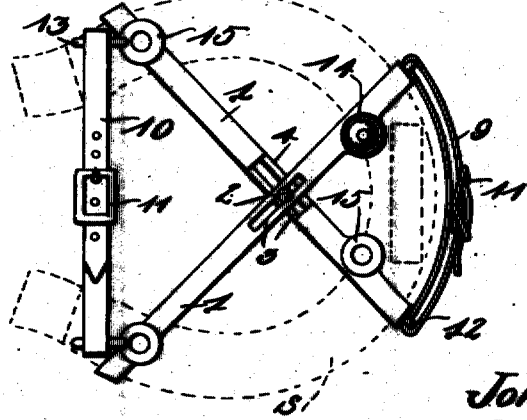
Inventor
John J. Connor

UNITED STATES PATENT OFFICE.

JOHN J. CONNOR, OF PROVIDENCE, RHODE ISLAND.

CALK OR CREEPER ATTACHMENT FOR HORSESHOES.

1,001,252.     Specification of Letters Patent.     Patented Aug. 22, 1911.

Application filed March 24, 1911. Serial No. 616,587.

*To all whom it may concern:*

Be it known that I, JOHN J. CONNOR, citizen of the United States, residing at Providence, in the county of Providence and State of Rhode Island, have invented certain new and useful Improvements in Calk or Creeper Attachments for Horseshoes, of which the following is a specification.

This invention relates to improvements in calk or creeper attachments for horse shoes and has for its object to provide a simple, inexpensive and durable device of this character which may be quickly and easily attached to or detached from the shoe.

A further object of the invention resides in the provision of a pair of loosely pivoted calk carrying bars of improved construction and improved means for securely fastening them upon the horse shoe and hoof.

With these and other objects in view the invention consists of certain novel features of construction, combination and arrangement of parts which will be more fully described and particularly pointed out in the appended claim.

In the accompanying drawings: Figure 1 is a side view of a hoof with the invention applied to the shoe thereon; Fig. 2 is a perspective view of the attachment; Fig. 3 is a bottom plan view, the horse shoe being indicated in dotted lines, three of the calks being removed; Fig. 4 is a detail cross sectional view through one of the calk carrying bars.

My invention comprises two crossed bars 1 having a loose pin and slot pivotal connection where they intersect and provided at their ends with means to engage the horse shoe S and the hoof H. The pivotal connection between the bars is effected by providing a pivot pin 2 having enlarged ends or heads and having its central portion arranged for sliding movement in slots 3 formed in the intermediate portions of the bars 1. One of the bars 1 has its slot formed in a downwardly offset portion 4 disposed beneath the longitudinal plane of the end portion of said bar whereby the end portions of the pivot bars will be disposed in the same horizontal plane as will be readily understood on reference to Figs. 1 and 2.

At the forward ends of the bars 1 are formed upwardly extending gripping fingers 5 adapted to engage above the shoe and hoof, the upper rearwardly turned extremities 6 of said fingers forming gripping spurs. At the rear ends of the bars 1 are formed upwardly bent gripping fingers 7 which engage the outer edges of the heel portions of the shoe adjacent the usual heel calks and have inwardly bent projections or spurs 8 to enter between the bottom of the hoof and the upper side of the shoe whereby the rear ends of the bars will be securely engaged with the shoe when the device is applied.

In order to fasten the bars in engagement with the shoe and hoof after they have been shifted on each other and their gripping fingers and spurs made to engage said parts, I provide front and rear flexible and adjustable members 9, 10 preferably in the form of straps having their ends adjustably connected by buckles 11 or analogous adjusting devices. The front strap 9 passes through vertically disposed eyes 12 formed by U-shaped loops arranged on the front faces of the fingers 5 whereby the straps 9 will extend across the front of the toe portion of the hoof and cause the front ends of the bars 1 to be securely retained in position. The rear strap 10 passes through rearwardly and horizontally disposed eyes 13 in the form of U shaped members projecting rearwardly from the rear end portions of the bars 1. This arrangement of the eyes or loops 13 causes the strap 10 to be disposed beneath the heel portions of the shoe as clearly shown in Fig. 3.

The bars 1 have depending from them calks 14 which may be of any form and construction but are preferably detachably connected to said bars. One manner of connecting the calks is illustrated in Fig. 4 and consists in forming threaded openings in enlargements 15 formed on the bars 1 adjacent their ends. Each calk 14 has a tapered lower end and a reduced threaded upper end or shank 16 which latter screws into one of the threaded openings of one of the enlargements 15. The intermediate portion of each calk has a flat faced wrench engaging portion 17 and a protecting annular flange 18 for said flat faced portion.

From the foregoing it will be seen that by constructing the bars with the gripping members at their ends and with the loose pivotal connection intermediate their ends, they may be readily adjusted upon each other and caused to effectively grip the shoe and hoof; and by providing the flexible and adjustable connecting straps or similar devices 9 and 10, said members will be effectively retained in their adjusted positions.

It will be noted that by providing the pivot pin 2 for free movement in the longitudinal slots 3, of both of the cross bars 1, the latter may shift freely on each other and into different angular positions with respect to each other, so that the device may accommodate itself to horse shoes and hoofs of any size within certain limits. The provision of this particular loose connection and the provision of the two adjustable strips 9 and 10 between the front and rear ends of the bars 1, enable the device to be readily applied to different sized shoes and hoofs, and at the same time, cause the device to be effectively fastened in position, while permitting of its ready removal. This construction enables the device to be quickly attached to or removed from the shoe and provides a device which will not only be durable and effective in use but which may be made at a small cost and applied to various kinds and sizes of horse shoes without altering the construction in any way.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention as defined in the appended claim.

I claim:

An attachment of the character set forth comprising crossed calk carrying bars formed at their point of intersection with longitudinal slots, the slot in one being formed in an offset intermediate portion, a pivot slidably mounted in the intersecting slots of the two bars and having headed ends, upstanding shoe gripping fingers formed on the front ends of said bars and having inturned spurs at their upper extremities to engage the hoof, shoe gripping fingers extending upwardly from the rear ends of said bars and having forwardly extending tapered projections at their upper extremities to enter between the hoof and the shoe, eyes arranged vertically on the shoe gripping fingers at the front ends of said bars, a strap passed through the last mentioned eyes and having its ends adjustably connected, eyes arranged horizontally on the rear portions of said bars, and a second strap passed through the last mentioned eyes and having its ends adjustably connected, as and for the purpose set forth.

In testimony whereof I affix my signature in presence of two witnesses.

JOHN J. CONNOR.

Witnesses:
HENRY A. MURPHY,
JOHN C. QUINN.

---

Copies of this patent may be obtained for five cents each, by addressing the "Commissioner of Patents, Washington, D. C."